UNITED STATES PATENT OFFICE.

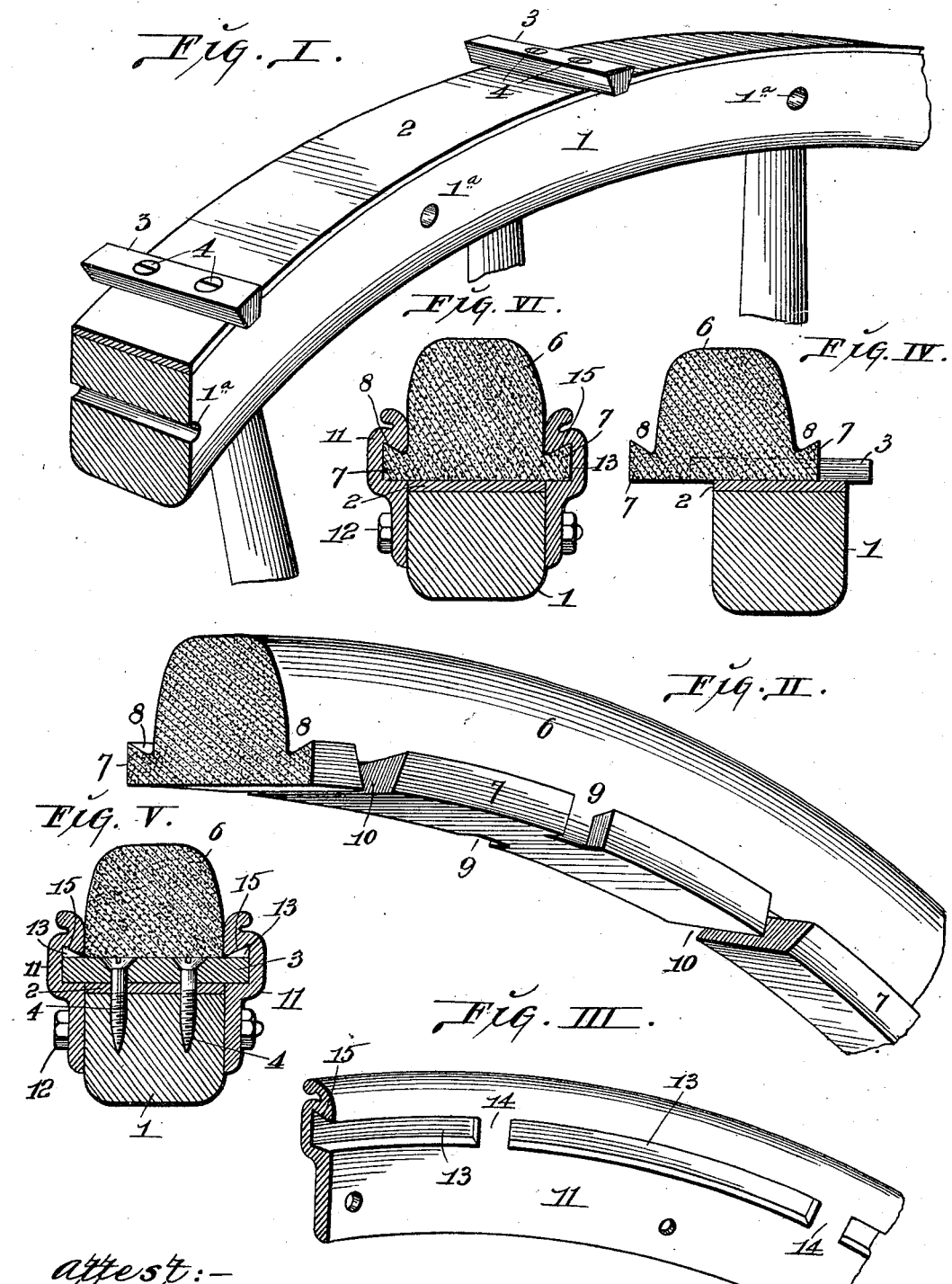

JOHN GLENN, OF ST. LOUIS, MISSOURI.

VEHICLE-TIRE.

SPECIFICATION forming part of Letters Patent No. 681,310, dated August 27, 1901.

Application filed January 5, 1901. Serial No. 42,151. (No model.)

*To all whom it may concern:*

Be it known that I, JOHN GLENN, a citizen of the United States, residing in the city of St. Louis, in the State of Missouri, have invented certain new and useful Improvements in Vehicle-Tires, of which the following is a full, clear, and exact description, reference being had to the accompanying drawings, forming part of this specification.

My invention relates to rubber tires for vehicle-wheels, the tire being of a construction particularly adapted for use on the wheels of motor-vehicles.

The object of the invention is to produce a tire of such a construction which is so held to the wheel that it will not become loose or separated from the wheel-rim under the strain thereon caused by excessive tractional strain between the wheel and the ground in the propulsion of vehicles that are operated by self-carried motors.

The invention consists in features of novelty hereinafter fully described, and pointed out in the claim.

Figure I is a perspective view showing a fragment of a wheel-rim constructed in accordance with my invention. Fig. II is a perspective view of a fragment of rubber tire constructed in accordance with my invention. Fig. III is a perspective view of a fragment of one of the tire-retaining rings. Fig. IV is a cross-sectional view of the wheel-rim and tire, showing the tire as it appears in the act of placing it upon the rim. Fig. V is a cross-sectional view of the rim and tire at the location of one of the tire-retaining cross-bars carried by the wheel-rim. Fig. VI is a similar view to Fig. V, taken through the rim and tire at a location between two of the tire-retaining cross-bars.

1 designates the felly of the wheel-rim, which is encircled by a metal band 2.

3 designates cross-bars positioned at intervals upon the perimeter of the wheel, the bars partaking, preferably, of the shape of dovetail tenons and being secured by any suitable means, such as screws 4, that pass through the metal band 2 and into the felly 1. Each of the cross-bars 3 preferably extends beyond the sides of the wheel-rim, as seen in Figs. I, IV, and V.

6 designates the rubber tire, that may have a tread of any suitable shape. Projecting outwardly at the base of the tire 6, at each side thereof, are ribs 7 of such width that they project beyond the sides of the rim of the wheel, as seen in Fig. VI. Each of the ribs 7 is provided with inwardly and downwardly tapering upper faces 8, and at intervals throughout the ribs are notches 9, the purpose of which will hereinafter appear. Extending crosswise through the base of the tire are grooves 10, that are adapted to receive the cross-bars 3, carried by the wheel-rim. The grooves 10 are dovetailed to correspond to the shape of the cross-bars 3, so that said cross-bars will be firmly seated in the grooves when the tire is applied to the rim of the wheel. By the engagement between the tire and wheel-rim, through means of the cross-bars seated in the grooves 10, the tire is retained from slippage on the circumference of the wheel-rim, owing to a firm hold being thus effected between the parts at frequent intervals throughout the wheel's circumference.

11 designates retaining-rings applied to the sides of the wheel-rim and secured thereto by bolts 12, that pass through apertures $1^a$ in the felly 1. The retaining-rings 11 are provided on their interior sides with grooves 13, separated at intervals by tenons 14. (See Fig. III.) The grooves 13 are provided with inwardly and downwardly tapering upper faces 15, (see Figs. III, V, and VI,) that correspond to the shape of the upper faces 8 of the rubber tire 6, that receive them. The grooves 13 receive the ribs 7 when the retaining-rings 11 are placed in position against the sides of the wheel-rim, as seen in Fig. VI, and when the elastic ribs have been pressed into place in said grooves they are firmly held in place by reason of the ribs being wider at their edges than at the junction between them and the main body of the tire. It will therefore be seen that the tire is firmly held to the wheel-rim, so that any strain upon it cannot cause it to be pulled therefrom. The tenons 14 between the grooves 13 and at the inner sides of the retaining-rings enter the notches 9 in the ribs 7 and add additional security against the slippage of the tire around the circumference of the wheel-rim, thereby acting in conjunction with the cross-bars 3 and serving the same purpose as such cross-bars.

In applying the tire to the rim of the wheel it is first slipped thereonto in the manner illustrated in Fig. IV, in which action the cross-bars 3 enter the grooves 10 in the rubber tire. After the tire has been applied to the rim the retainining-rings 11 are positioned at the sides of the wheel-rim and are pressed against the ribs 7 to cause said ribs to enter the grooves 13. The bolts 12 are then inserted and tightened and the wheel is in condition for use. The overhanging edges of the retaining-rings 11 serve to retain the cross-bars 3 and relieve the strain upon the screws 4, as seen in Fig. V.

I claim as my invention—

The combination with a wheel-rim, of a tire having laterally-projecting ribs provided at intervals with notches, and independent retaining-rings applied to the sides of the wheel-rim and having grooves adapted to receive the ribs of said tire and having tenons adapted to enter the notches in said ribs, substantially as described.

JOHN GLENN.

In presence of—
  E. S. KNIGHT,
  M. P. SMITH.